(12) United States Patent
Ok et al.

(10) Patent No.: US 8,013,086 B2
(45) Date of Patent: Sep. 6, 2011

(54) METHOD FOR PREPARING ELASTOMERIC COPOLYMERS OF ETHYLENE AND α-OLEFINS

(75) Inventors: Myungahn Ok, Daejeon (KR); Daeho Shin, Daejeon (KR); Seungbum Kwon, Daejeon (KR); Jongsok Hahn, Daejeon (KR); Hoseong Lee, Daejeon (KR); Choonsik Shim, Daejeon (KR); Hyeongtaek Ham, Daejeon (KR); Jisu Jeong, Daejeon (KR); Sungseok Chae, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 0 days.

(21) Appl. No.: 12/612,157

(22) Filed: Nov. 4, 2009

(65) Prior Publication Data
US 2010/0113720 A1 May 6, 2010

(30) Foreign Application Priority Data

Nov. 5, 2008 (KR) .................. 10-2008-0109174
Sep. 2, 2009 (KR) .................. 10-2009-0082288

(51) Int. Cl.
C08F 4/64 (2006.01)
C08F 4/6592 (2006.01)
C08F 210/02 (2006.01)
B01J 31/22 (2006.01)

(52) U.S. Cl. .................. 526/160; 526/165; 526/348.2; 526/352.2; 526/943

(58) Field of Classification Search .................. 526/160, 526/165, 348, 348.2, 943, 352.2
See application file for complete search history.

(56) References Cited

U.S. PATENT DOCUMENTS

| 4,752,597 A | 6/1988 | Turner |
| 5,198,401 A | 3/1993 | Turner et al. |
| 6,329,478 B1 | 12/2001 | Katayama et al. |
| 2007/0004586 A1* | 1/2007 | Woo et al. .................. 502/117 |

FOREIGN PATENT DOCUMENTS

| EP | 0320762 B1 | 6/1989 |
| EP | 0372632 A1 | 6/1990 |
| EP | 0416815 A2 | 3/1991 |
| EP | 0420436 A1 | 4/1991 |
| EP | 0842939 A1 | 5/1998 |
| JP | 63-92621 | 4/1988 |
| JP | 2-84405 | 3/1990 |
| JP | 3-2347 | 1/1991 |
| KR | 2001-0074722 A | 8/2001 |

OTHER PUBLICATIONS

J.C. Randal, J. C. JMS-Rev. Macromol. Chem. Phys. 1980, C29, 201.

* cited by examiner

*Primary Examiner* — Caixia Lu
(74) *Attorney, Agent, or Firm* — Clark & Brody

(57) ABSTRACT

Provided is a process for preparing copolymers of ethylene with α-olefin. More specifically, provided are transition metal compound being useful as catalyst for preparing those copolymers, a catalyst composition comprising the same, and a process for preparing elastic copolymers of ethylene with α-olefin, having the density of not more than 0.910, which can be adopted to a wide variety of applications including film, electric wires, and hot-melt adhesives. The catalyst composition is a catalytic system which comprises transition metal catalyst comprising a cyclopentadiene derivative and at least one anionic ligand(s) of aryloxy group with an aryl derivative at ortho-position, and boron or aluminum compound as an activator. Provided is a process for copolymerizing ethylene with α-olefin to produce copolymer having narrow molecular weight distribution and uniform density distribution with the density of not more than 0.910, with high activity and excellent reactivity on higher α-olefin.

14 Claims, 2 Drawing Sheets

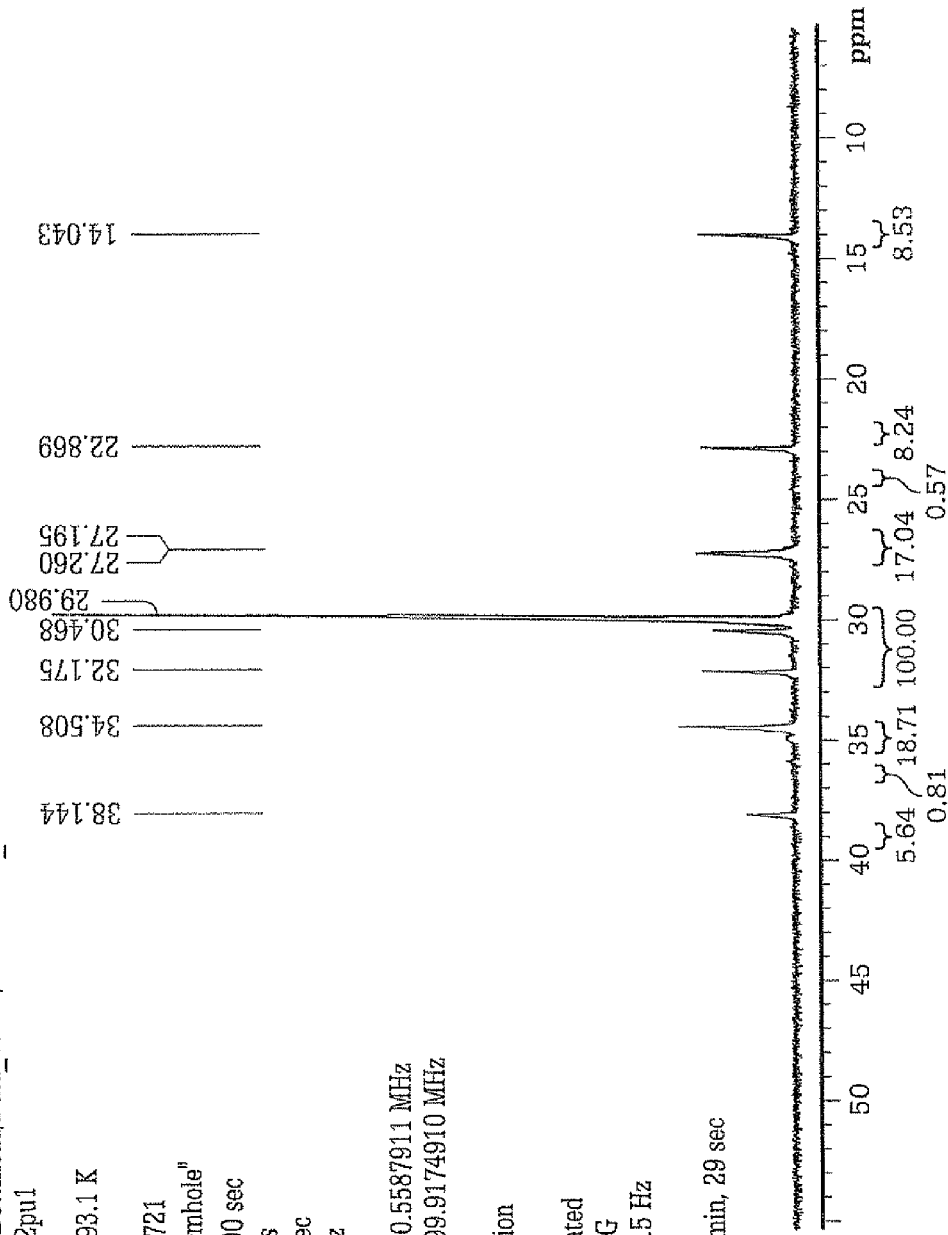

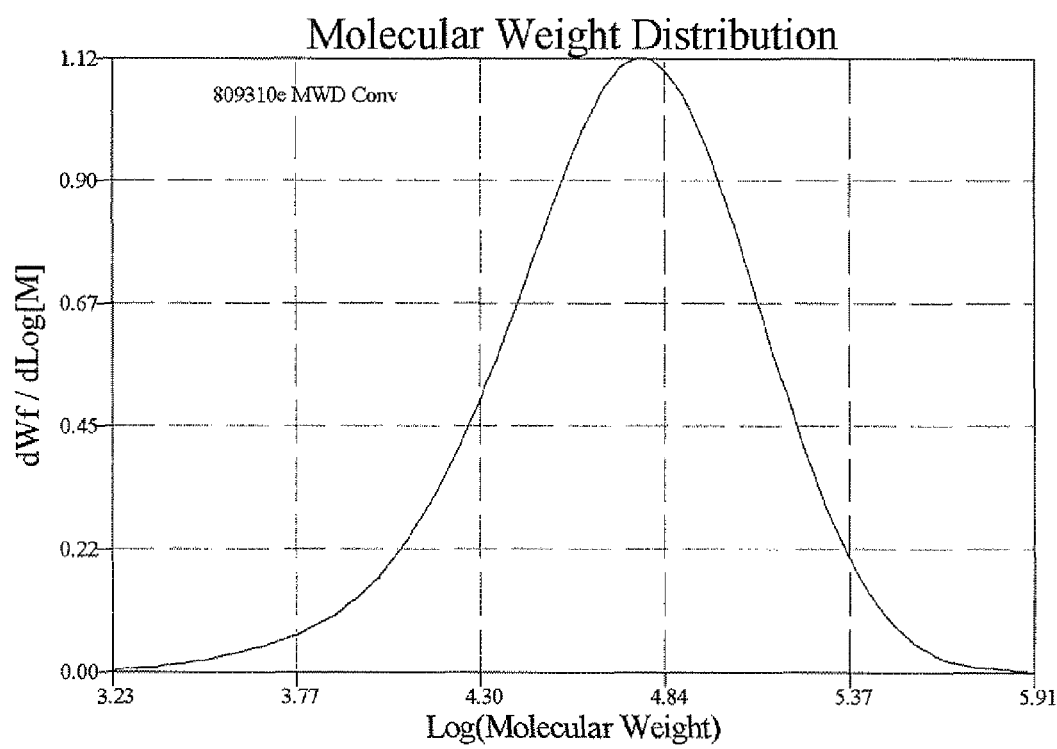
[Fig. 2]

METHOD FOR PREPARING ELASTOMERIC COPOLYMERS OF ETHYLENE AND α-OLEFINS

TECHNICAL FIELD

The present invention relates to a process for preparing elastomeric copolymers of ethylene with α-olefin. More specifically, it relates to a catalytic system comprising Group 4 transition metal catalyst and aluminoxane cocatalyst or boron compound cocatalyst, or a process for preparing elastomeric copolymers of ethylene with α-olefin using the system.

BACKGROUND ART

Conventionally, so-called Ziegler-Natta catalysts which generally consist of a titanium or vanadium compound as a primary catalyst component and an alkylaluminium compound as a cocatalyst component have been usually employed for preparing copolymers of ethylene with α-olefins. Though a Ziegler-Natta catalytic system exhibits high activity on ethylene homo-polymerization, the catalytic system is disadvantageous (due to its irregular catalyst activation point) in that a large amount of α-olefin comonomer should be used for preparing elastomeric copolymer of ethylene with α-olefin, having the density of 0.910 or less, because of its poor reactivity of copolymerization with higher α-olefin. In this situation, activity of the catalyst becomes lower. Further, the copolymers prepared by using such catalyst show very irregular distribution of composition and broad molecular weight distribution, thereby being unsuitable as elastomer.

Recently, metallocene catalytic systems consisting of a metallocene compound of Group 4 transition metal in the Periodic Table of Elements, such as titanium, zirconium and hafnium, and methyl aluminoxane as a cocatalyst have been developed. Since the metallocene catalytic system is a homogeneous catalyst having a mono-modal catalyst activation point, it can provide copolymers of ethylene and α-olefin, having narrow molecular weight distribution and homogenous composition distribution as compared to conventional Ziegler-Natta catalyst.

For example, European Patent Publication Nos. 320,762 and 3,726,325; Japanese Patent Laid-Open Nos. Sho 63-092621, Hei 02-84405 and Hei 03-2347 reported that ethylene and α-olefin can be copolymerized with high activity by activating the metallocene compounds such as $Cp_2TiCl_2$, $Cp_2ZrCl_2$, $Cp_2ZrMeCl$, $Cp_2ZrMe_2$, ethylene $(IndH_4)_2ZrCl_2$ by using methyl aluminoxane as cocatalyst, to provide copolymer of ethylene with α-olefin having the molecular weight distribution (Mw/Mn) in the range from 1.5 to 2.0. However, the catalytic system is disadvantageous, when it is applied to solution polymerization carried out at a high temperature of 80° C. or higher, in that a large amount of higher α-olefin has to be employed (just as in the case of using Ziegler-Natta catalyst) in order to prepare elastomers having the density of 0.910 or less, due to steric hindrance of the catalyst itself. The process is not suitable for preparing high molecular weight polymer with weight average molecular weight (Mw) of not less than 30,000 because β-dehydrogenation preferentially occurs in this situation.

In the meanwhile, disclosed were so-called geo-restrictive non-metallocene type catalysts, wherein the transition metals are linked in the form of a ring, as catalysts for preparing high molecular weight polymers with high catalytic activity in copolymerization of ethylene with α-olefin under the condition of solution polymerization. European Patent Nos. 0416815 and 0420436 suggested the examples wherein amide groups are linked in the form of a ring to one cyclopentadiene ligand, while European Patent No. 0842939 showed exemplary catalysts wherein phenolic ligands (as electron donors) are linked to cyclopentadiene ligand in the form of a ring. The geo-restrictive catalyst could provide noticeable enhancement in reactivity with higher α-olefins, due to reduced steric hindrance of the catalyst itself. However, there are many difficulties to realize an economic and effective process for preparing copolymers of ethylene with α-olefin, having the density of not more than 0.910, since the synthetic process for the catalyst is complicated, and the yield of the procedure of ring formation between the ligands and the transition metal compounds is very low.

On the other hand, examples of non-metallocene catalysts that are not geo-restrictive can be found in U.S. Pat. No. 6,329,478 and Korean Patent Laid-Open No. 2001-0074722. It is found that the catalyst of single activation point, which employs at least one phosphinimine compound(s) as a ligand(s), showed high ethylene conversion in the copolymerization of ethylene with α-olefin under the condition of solution polymerization at a high temperature of 140° C. or more. However those catalysts showed low reactivity with higher α-olefin, being similar to the metallocene catalyst, so that it is not suitable for preparing elastomers of ethylene with higher α-olefin.

DISCLOSURE

Technical Problem

In order to overcome the problems of conventional techniques, the present inventors carried out extensive studies, and found that catalyst, which comprises a cyclopentadiene derivative, and at least one anionic ligand(s) containing aryloxy group with aryl substituent at ortho-position, or catalytic system of the catalyst with aluminoxane or boron or aluminum compound as an activator is suitable for preparing elastic copolymer of ethylene with α-olefin, having narrow molecular weight distribution and the density of not more than 0.910 along with uniform density distribution. Based on the discovery, the inventors completed the present invention.

Thus, an object of the invention is to provide transition metal compounds which are useful as catalysts for preparing copolymers of ethylene with α-olefin, which have the density of not more than 0.910 and is usable for various applications such as film, soft package materials, molding products, electric wires, impact resistant reinforcing agents and hot-melt adhesives; catalyst composition comprising the catalyst; and a process for preparing copolymers of ethylene with α-olefin, having the density of not more than 0.910, by using the same. Further, the invention is to provide single activation point catalyst showing excellent reactivity with higher α-olefin with high activity in the copolymerization of ethylene and α-olefin (the copolymer having the density of not more than 0.910), and an economic industrial process for preparing copolymers of ethylene with α-olefin, having narrow molecular weight distribution and composition distribution with weight average molecular weight of not less than 30,000, by using the catalyst component.

Technical Solution

To achieve the objects of the present invention, one aspect of the present invention provides a process for preparing copolymers of ethylene with α-olefin, having the density of 0.850~0.910 g/cc, by copolymerizing, in a single reactor or dual continuous reactors connected in series or in parallel, ethylene and one or more (C3-C18) α-olefin comonomer(s) in the presence of catalyst composition comprising the catalyst of Chemical Formula (1), which comprises around the Group 4 transition metal a cyclopentadiene derivative and at least one anionic ligand(s) containing aryloxy group with aryl substituent at ortho-position, and aluminoxane or boron or aluminum compound as an activator.

[Chemical Formula 1]

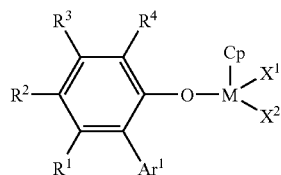

In the formula, M represents transition metal from Group 4 in the Periodic Table of Elements;

Cp represents cyclopentadienyl ring which is $\eta^5$-linkable to the core metal M, or a fused ring containing a cyclopentadienyl ring, and the cyclopentadienyl ring or the fused ring containing a cyclopentadienyl ring may be further substituted by one or more substituent(s) selected from (C1-C20)alkyl, (C6-C30)aryl, (C2-C20)alkenyl and (C6-C30)ar(C1-C20)alkyl;

$R^1$ through $R^4$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^1$ through $R^4$ may be linked to an adjacent substituent via (C3-C12)alkylene or (C3-C12) alkenylene with or without containing a fused ring to form an alicyclic ring, or a monocyclic or polycyclic aromatic ring;

$Ar^1$ represents (C6-C30)aryl or (C3-C30)heteroaryl containing one or more heteroatom(s) selected from N, O and S;

$X^1$ and $X^2$ independently represent halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or

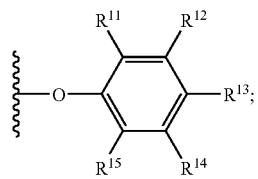

$R^{11}$ through $R^{15}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^{11}$ through $R^{15}$ may be linked to an adjacent substituent via (C3-C12)alkylene or (C3-C12) alkenylene with or without containing a fused ring to form an alicyclic ring, or a monocyclic or polycyclic aromatic ring; and the alkyl, aryl, cycloalkyl, aralkyl, alkoxy, alkylsiloxy, arylsiloxy, alkylamino, arylamino, alkylthio or arylthio of $R^1$ through $R^4$, $R^{11}$ through $R^{15}$, $X^1$ and $X^2$; the ring formed by linkage of each of $R^1$ through $R^4$ or $R^{11}$ through $R^{15}$ to an adjacent substituent via alkylene or alkenylene; or the aryl or heteroaryl of $Ar^1$ and $Ar^{11}$ may be further substituted by one or more substituent(s) selected from halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro and hydroxyl.

Now, the present invention is described in more detail.

According to the present invention, used is a catalyst composition which comprises the transition metal catalyst represented by Chemical Formula (1) and cocatalyst. The cocatalyst may be selected from boron compounds and aluminum compounds, and mixtures thereof.

First, the compound of Chemical Formula (1) is Group 4 transition metal catalyst which comprises around the transition metal a cyclopentadiene derivative and at least one aryloxide ligand(s) containing an aryl derivative at the ortho-position, and no crosslinkage between the ligands.

[Chemical Formula 1]

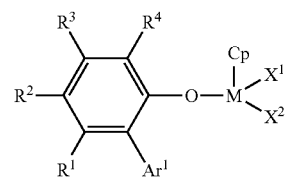

In Chemical Formula (1), the core metal M represents transition metal from Group 4 in the Periodic Table of Elements, preferably titanium, zirconium or hafnium.

Group Cp represents cyclopentadienyl ring which is $\eta^5$-linkable to the core metal M, or a fused ring containing a cyclopentadienyl ring, and the cyclopentadienyl ring or the fused ring containing a cyclopentadienyl ring may be further substituted by one or more substituent(s) selected from (C1-C20)alkyl, (C6-C30)aryl, (C2-C20)alkenyl and (C6-C30)ar(C1-C20)alkyl. Specific examples of Cp include cyclopentadienyl, methylcyclopentadienyl, dimethylcyclopentadienyl, tetramethylcyclopentadienyl, pentamethylcyclopentadienyl, butylcyclopentadienyl, sec-butylcyclopentadienyl, tert-butylmethylcyclopentadienyl, trimethylsilylcyclopentadienyl, indenyl, methylindenyl, dimethylindenyl, ethylindenyl, isopropylindenyl, fluorenyl, methylfluorenyl, dimethylfluorenyl, ethylfluorenyl, isopropylfluorenyl, and so on.

Group $R^1$ through $R^4$ on the arylphenoxide ligand of Chemical Formula (1) independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio or nitro, or each of $R^1$ through $R^4$ may be linked to an adjacent substituent via (C3-C12)alkylene or (C3-C12) alkenylene with or without containing a fused ring to form an alicyclic ring, or a monocyclic or polycyclic aromatic ring;

$Ar^1$ represents (C6-C30)aryl or (C3-C30)heteroaryl containing one or more heteroatom(s) selected from N, O and S;

$X^1$ and $X^2$ independently represent halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or

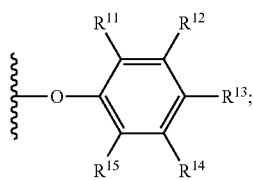

$R^{11}$ through $R^{15}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^{11}$ through $R^{15}$ may be linked to an adjacent substituent via (C3-C12)alkylene or (C3-C12) alkenylene with or without containing a fused ring to form an alicyclic ring, or a monocyclic or polycyclic aromatic ring; and the alkyl, aryl, cycloalkyl, aralkyl, alkoxy, alkylsiloxy, arylsiloxy, alkylamino, acylamino, alkylthio or arylthio of $R^1$ through $R^4$, $R^{11}$ through $R^{15}$, $X^1$ and $X^2$; the ring formed by linkage of each of $R^1$ through. $R^4$ or $R^{11}$ through $R^{15}$ to an adjacent substituent via alkylene or alkenylene; or the aryl or heteroaryl of $Ar^1$ and $Ar^{11}$ may be further substituted by one or more substituent(s) selected from halogen atom, (C1-C20) alkyl, (C3-C20)cycloalkyl, (C6-C30)aryl, (C6-C30)ar(C1-C10)alkyl, (C1-C20)alkoxy, (C3-C20)alkylsiloxy, (C6-C30) arylsiloxy, (C1-C20)alkylamino, (C6-C30)arylamino, (C1-C20)alkylthio, (C6-C30)arylthio, nitro and hydroxyl.

Examples of halogen atoms include fluorine, chlorine, bromine and iodine atoms.

Examples of (C1-C20)alkyl or (C3-C20)cycloalkyl include methyl, ethyl, n-propyl, isopropyl, n-butyl, sec-butyl, tert-butyl, n-pentyl, neopentyl, n-hexyl, n-octyl, n-decyl, n-dodecyl, n-pentadecyl and n-eicosyl; among them, preferable are methyl, ethyl, isopropyl and tert-butyl.

Examples of (C6-C30)aryl include phenyl, naphthyl, anthracenyl and fluorenyl.

Examples of (C6-C30)ar(C1-C20)alkyl group include benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (4,6-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6)-tetramethylphenyl)methyl, (2,3,5,6-tetramethylphenyl)methyl, (pentamethylphenyl)methyl, (ethylphenyl)methyl, (n-propylphenyl)methyl, (isopropylphenyl)methyl, (n-butylphenyl) methyl, (sec-butylphenyl)methyl, (n-tetradecylphenyl)methyl, triphenylmethyl, naphthylmethyl and anthracenylmethyl; among them, preferable are benzyl and triphenylmethyl.

Examples of (C1-C20)alkoxy include methoxy, ethoxy, n-propoxy, isopropoxy, n-butoxy, sec-butoxy, tert-butoxy, n-pentoxy, neopentoxy, n-hexoxy, n-octoxy, n-dodecoxy, n-pentadecoxy and n-eicosoxy; among them, preferable are methoxy, ethoxy, isopropoxy and tert-butoxy.

Examples of (C3-C20)alkylsiloxy or (C6-C30)arylsiloxy include trimethylsiloxy, triethylsiloxy, tri-n-propylsiloxy, triisopropylsiloxy, tri-n-butylsiloxy, tri-sec-butylsiloxy, tri-tert-butylsiloxy, tri-isobutylsiloxy, tert-butyldimethylsiloxy, tri-n-pentylsiloxy, tri-n-hexylsiloxy and tricyclohexylsiloxy, phenylsiloxy, diphenylsiloxy and naphthylsiloxy; among them, preferable are trimethylsiloxy, tert-butyldimethylsiloxy and phenylsiloxy.

Examples of (C1-C20)alkylamino or (C6-C30)arylamino include dimethylamino, diethylamino, di-n-propylamino, diisopropylamino, di-n-butylamino, di-sec-butylamino, di-tert-butylamino, diisobutylamino, tert-butylisopropylamino, di-n-hexylamino, di-n-octylamino, di-n-decylamino, diphenylamino, dibenzylamino, methylethylamino, methylphenylamino and benzylhexylamino; among them, preferable are dimethylamino, diethylamino and diphenylamino.

Examples of (C1-C20)alkylthio or (C6-C30)arylthio include methylthio, ethylthio, isopropylthio, phenylthio and naphthylthio.

Specifically, the compound represented by Chemical Formula (1) can be selected from those represented by one of the following Chemical Formulas:

[Chemical Formula 1-1]

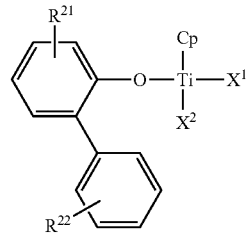

[Chemical Formula 1-2]

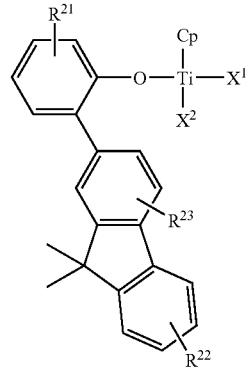

[Chemical Formula 1-3]

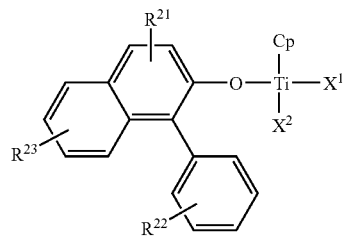

[Chemical Formula 1-4]

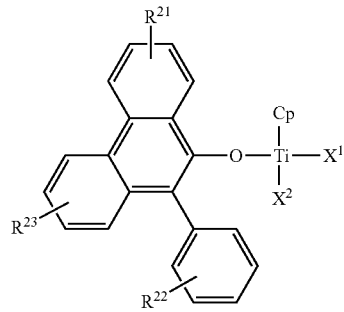

[Chemical Formula 1-5]
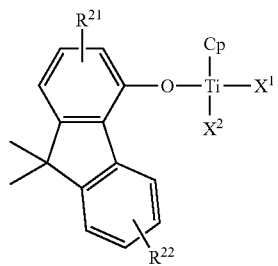
[Chemical Formula 1-6]
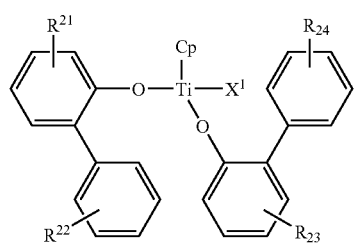
[Chemical Formula 1-7]
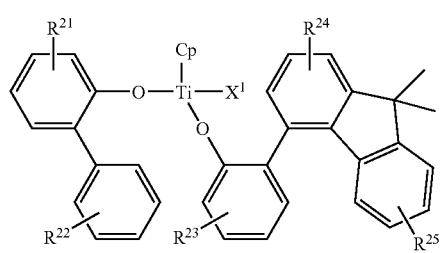
[Chemical Formula 1-8]
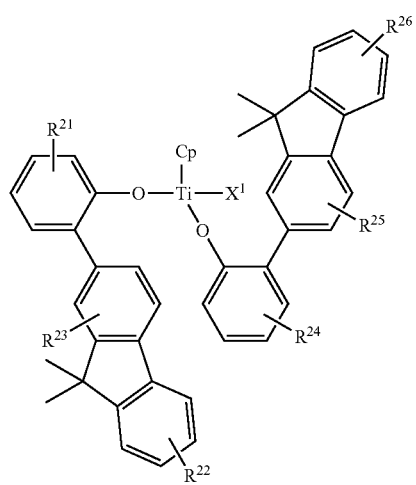
[Chemical Formula 1-9]
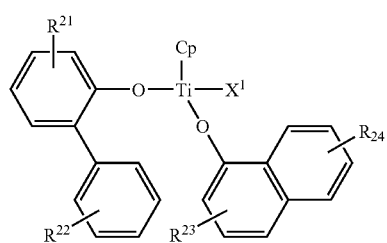
[Chemical Formula 1-10]
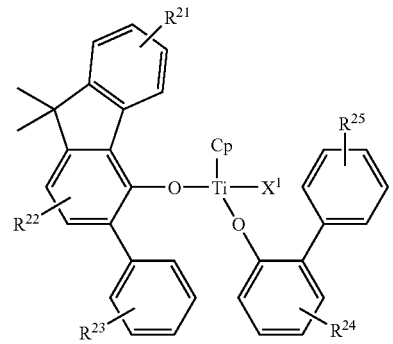
[Chemical Formula 1-11]
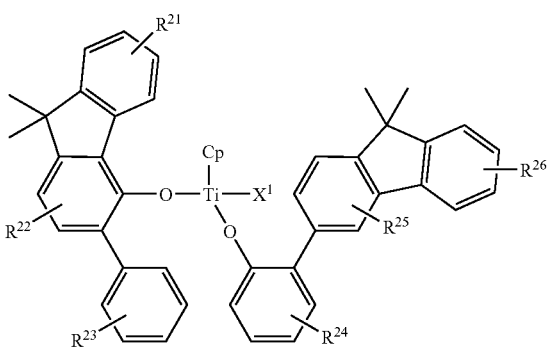
[Chemical Formula 1-12]
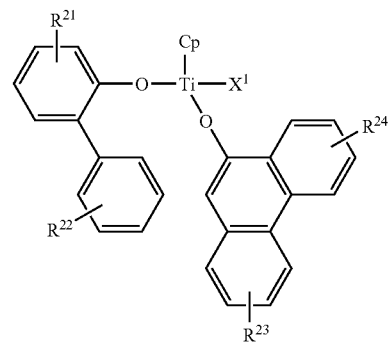
[Chemical Formula 1-13]
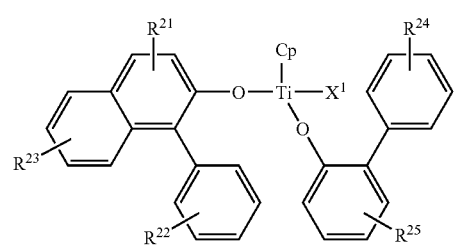

[Chemical Formula 1-14]

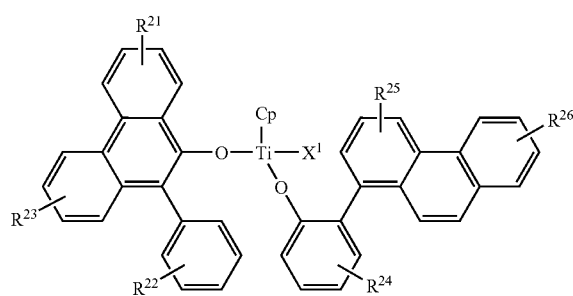

wherein, $R^{21}$ through $R^{26}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^{21}$ through $R^{26}$ may be linked to an adjacent substituent via (C3-C12)alkylene or (C3-C12) alkenylene with or without containing a fused ring to form an alicyclic ring, or a monocyclic or polycyclic aromatic ring; the alkyl, aryl, cycloalkyl, aralkyl, alkoxy, alkylsiloxy, arylsiloxy, alkylamino, arylamino, alkylthio or arylthio of $R^{21}$ through $R^{26}$ may be further substituted by one or more substituent(s) selected from halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro and hydroxyl;

Cp represents a cyclopentadienyl ring which is $\eta^5$-linkable to the core metal M, or a fused ring containing a cyclopentadienyl ring, and the cyclopentadienyl ring or the fused ring containing a cyclopentadienyl ring may be further substituted by one or more substituent(s) selected from (C1-C20)alkyl, (C6-C30)aryl, (C2-C20)alkenyl and (C6-C30)ar(C1-C20)alkyl; and $X^1$ and $X^2$ independently represent methyl or Cl.

More specifically, the process for preparing ethylene copolymer employs transition metal catalyst selected from the compounds represented by one of the following Chemical Formulas:

1-1-1

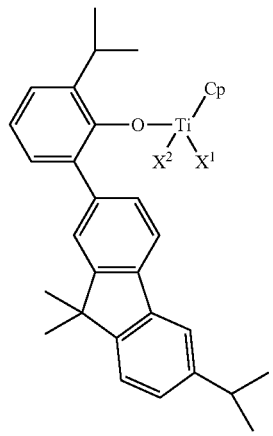

1-1-2

1-2-1

1-3-1

1-4-1

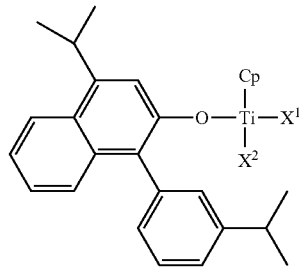

1-5-1

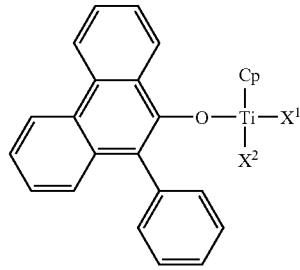

1-6-1

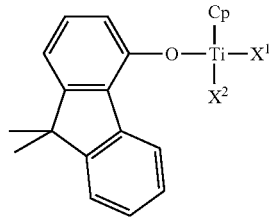

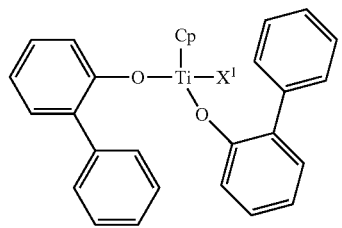

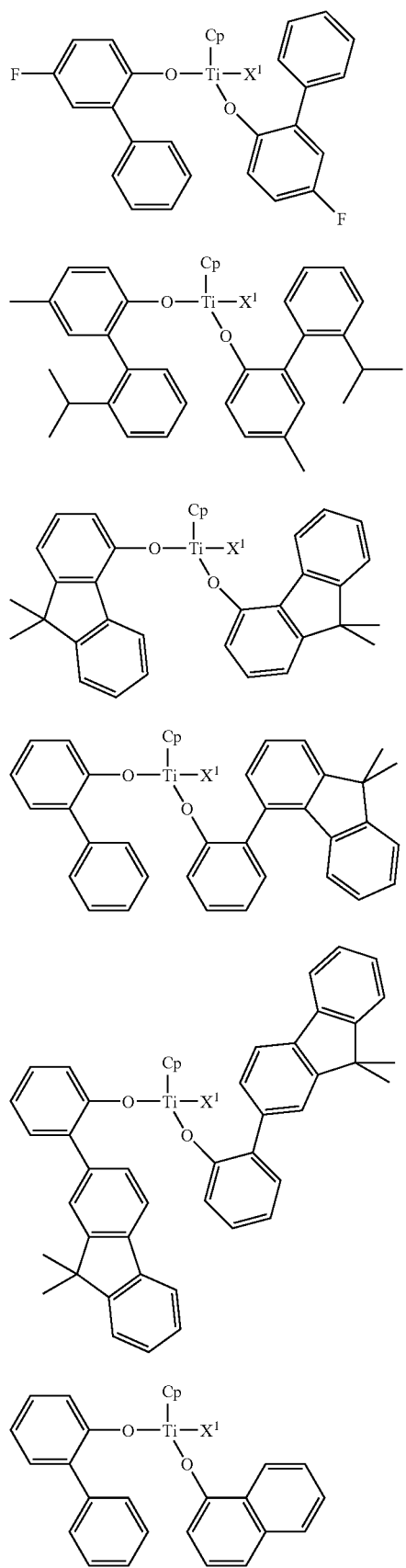
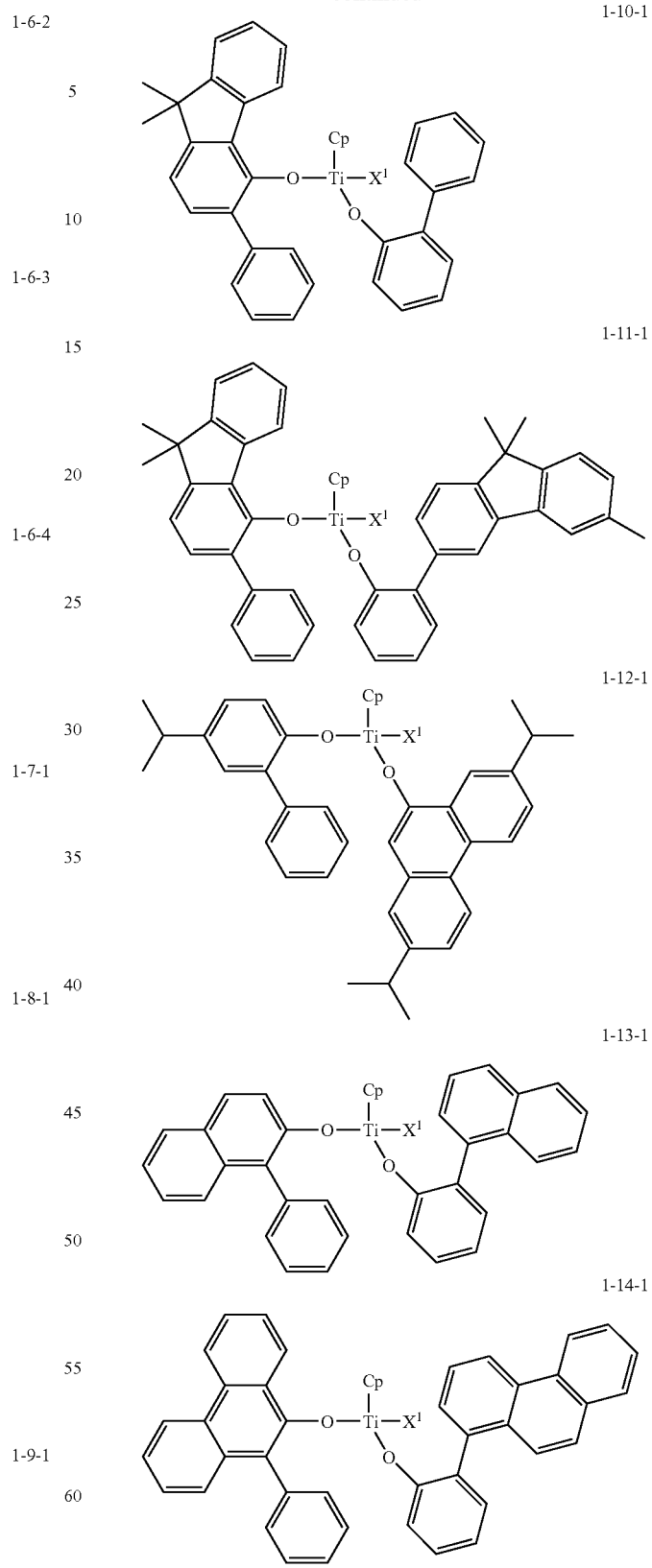
wherein, Cp independently represents cyclopentadienyl ring which is η⁵-linkable to the core metal M, or a fused ring containing a cyclopentadienyl ring, and the fused ring containing a cyclopentadienyl ring may be further substituted by one or more substituent(s) selected from (C1-C20)alkyl, (C6-C30)aryl, (C2-C20)alkenyl and (C6-C30)ar(C1-C20)alkyl; and $X^1$ and $X^2$ independently represent methyl or Cl.

In the meanwhile, in order to provide active catalyst component to be used for olefin polymerization, the transition metal catalyst represented by Chemical Formula (1) may be employed preferably with aluminoxane compound or boron compound, or a mixture thereof as cocatalyst, which can extract X ligand from the transition metal compound to cationize the core metal and act as a counterion (that is, an anion) having weak bond strength. Though the organic aluminum compound employed herein aims at removing a trace amount of polar substances (which act as catalyst poison in the reaction solvent), it may also serve as an alkylating agent when X ligand is halogen.

The boron compounds being usable as cocatalyst according to the present invention are disclosed in U.S. Pat. No. 5,198,401, and can be selected from the compounds represented by one of Chemical Formulas (2) to (4):

$B(R^{31})_3$ [Chemical Formula 2]

$[R^{32}]^+[B(R^{31})_4]^-$ [Chemical Formula 3]

$[(R^{33})_qZH]^+[B(R^{31})_4]^-$ [Chemical Formula 4]

wherein, B represents boron atom; $R^{31}$ represents phenyl, which may be further substituted by three to five substituent(s) selected from fluorine, (C1-C20)alkyl with or without fluorine substituent(s) and (C1-C20)alkoxy with or without fluorine substituent(s); $R^{32}$ represents (C5-C7)cycloalkyl radical or (C1-C20)alkyl(C6-C20)aryl radical, (C6-C30)ar(C1-C20)alkyl radical such as triphenylmethyl radical; Z represents nitrogen or phosphorus atom; $R^{33}$ represents (C1-C20)alkyl radical, or anilinium radical having two (C1-C4)alkyl substituent(s) with nitrogen atom; and q is an integer of 2 or 3.

Preferable examples of boron-containing cocatalyst include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenylbis(pentafluorophenyl)borane, tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenylbis(pentafluorophenyl)borate and tetrakis(3,5-bistrifluoromethylphenyl)borate. Specific blends thereof include ferrocenium tetrakis(pentafluorophenyl)borate, 1,1'-dimethylferrocenium tetrakis(pentafluorophenyl)borate, silver tetrakis(pentafluorophenyl)borate, triphenylmethyl tetrakis(pentafluorophenyl)borate, triphenylmethyl tetrakis(3,5-bistrifluoromethylphenyl)borate, triphenylmethyl tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate and tri(dimethylphenyl) phosphonium tetrakis(pentafluorophenyl)borate. Amont them, more preferable are N,N-dimethylanilinium tetrakis(pentafluorophenyl)borate, triphenylmethyl tetrakis(pentafluorophenyl)borate and tris(pentafluorophenyl)borane. The molar ratio of the core metal M:boron atom is preferably 1:0.1~50, more preferably 1:0.5~15.

The aluminum compounds being usable for the present invention include aluminoxane compounds represented by Chemical Formula (5) or (6), organoaluminum compounds represented by Chemical Formula (7), or organic aluminum hydrocarbyloxide compounds represented by Chemical Formula (8) or (9):

$(-Al(R^{41})-O-)_m$ [Chemical Formula 5]

$(R^{41})_2Al-(-O(R^{41})-)_p-(R^{41})_2$ [Chemical Formula 6]

$(R^{42})_rAl(E)_{3-r}$ [Chemical Formula 7]

$(R^{43})_2AlOR^{44}$ [Chemical Formula 8]

$R^{43}Al(OR^{44})_2$ [Chemical Formula 9]

wherein, $R^{41}$ represents linear or non-linear (C1-C20) alkyl, preferably methyl or isobutyl; m and p independently are integers from 5 to 20; $R^{42}$ and $R^{43}$ independently represent (C1-C20)alkyl; E represents hydrogen or halogen atom; r is an integer from 1 to 3; and $R^{44}$ represents (C1-C20)alkyl or (C6-C30)aryl.

Specific examples of the aluminum compounds include aluminoxane compounds such as methylaluminoxane, modified methylaluminoxane and tetraisobutylaluminoxane; organic aluminum compounds including trialkylaluminium such as trimethylaluminum, triethylaluminum, tripropylaluminum, triisobutylaluminum and trihexylaluminum; dialkylaluminum chloride such as dimethylaluminum chloride, diethylaluminum chloride, dipropylaluminum chloride, diisobutylaluminum chloride and dihexylaluminum chloride; alkylaluminum dichloride such as methylaluminum dichloride, ethylaluminum dichloride, propylaluminum dichloride, isobutylaluminum dichloride and hexylaluminum dichloride; and dialkylaluminum hydride such as dimethylaluminum hydride, diethylaluminum hydride, dipropylaluminum hydride, diisobutylaluminum hydride and dihexylaluminum hydride. Among them, preferable is trialkylaluminum, more preferable is triethylaluminum and triisobutylaluminum. The molar ratio of the core metal M:aluminum atom is preferably from 1:1 to 1:2,000, more preferably from 1:5 to 1:1,000.

Further, the core metal M:boron atom:aluminum atom is preferably 1:0.1~50:1~1,000, more preferably 1:0.5~15:5~500.

The process for preparing copolymers of ethylene with α-olefin, having the density of not more than 0.910, by employing the transition metal catalyst composition according to the present invention is carried out in solution by contacting the transition metal catalyst, cocatalyst, ethylene and α-olefin comonomer, in the presence of appropriate organic solvent. The reactor may be one or more continuous reactor(s) of stirred-tank or pipe type. When two or more reactors are used in series or in parallel, different copolymers (having different molecular weight and/or density) can be prepared for each reaction fraction under different conditions in each reactor, so that copolymers can be prepared in physicochemical mixtures.

Preferable organic solvents to be employed for the process for preparation include (C3-C20)hydrocarbon, specifically, butane, isobutane, pentane, hexane, heptane, octane, isooctane, nonane, decane, dodecane, cyclohexane, methylcyclohexane, benzene, toluene and xylene. Mixture of those solvents may be used, if desired.

As the comonomer, used can be (C3-C18) α-olefin, which is preferably selected from a group consisting of propylene, butene, 1-pentene, 4-methyl-1-pentene, 1-hexene, 1-octene, decene, 1-dodecene, 1-hexadecene and 1-octadecene, more preferably from 1-butene, 1-hexene, 1-octene and 1-decene.

The polymerization is carried out under a condition (temperature and pressure) wherein the reactants in the reactor can be present in solution. Preferable pressure in the polymerization reactor is from 10 to 200 atm, preferably from 20 to 150 atm, and the polymerization temperature is from 60 to 250° C., preferably from 80 to 170° C.

The copolymers prepared according to the process of the present invention comprise 40~90% by weight of ethylene, preferably 50~85%, more preferably 55~80% by weight of ethylene. The density ranges from 0.850 to 0.910 g/cc, preferably from 0.855 to 0.905 g/cc, more preferably from 0.860 to 0.900 g/cc.

Upon preparing the copolymers according to the invention, hydrogen may be employed as molecular weight modifier in order to adjust the molecular weight. The weight average molecular weight (Mw) of the polymers produced is usually from 30,000 to 500,000, with the molecular weight distribution from 1.5 to 3.0.

Being different from the copolymers prepared by using conventional Ziegler-Natta catalyst (wherein less branches from α-olefin occur in the high molecular weight section, but most of the branches exist in the low molecular weight section), the copolymers of ethylene with α-olefin according to the invention uniformly comprise α-olefin branches even in the high molecular weight section, but hardly comprise low molecular weight components with significant amount of α-olefin branches being extractable in hexane or the like. Thus, the copolymers would provide important physical properties as elastomer, and much improved hygiene of the final products.

Advantageous Effects

By virtue of the transition metal catalyst composition of catalytic activity and copolymerization reactivity with higher α-olefins according to the invention, and the process for preparing copolymers of ethylene and α-olefin by using the same, obtained can be elastic copolymers having higher molecular weight with density of 0.850~0.910 g/cc in higher yield, as compared to the process employing known metallocene and non-metallocene single activation catalysts.

Being a non-crosslinked single activation point catalyst, the synthetic process for preparing the catalyst is simple with high synthetic yield. Thus, the invention provides economic process since the catalyst can be manufactured with low cost, and the process for preparing the copolymer is carried out by using less amount of α-olefin comonomer.

Thus, the transition metal catalyst composition and the process in accordance with the present invention can be useful for preparation of copolymers of ethylene with α-olefin comonomers, having different physical properties and elasticity.

DESCRIPTION OF DRAWINGS

The above and other objects, features and advantages of the present invention will become apparent from the following description of preferred embodiments given in conjunction with the accompanying drawings:

FIG. 1 is $^{13}$C-NMR spectrum of the copolymer of ethylene with α-olefin in accordance with Example 11 of the present invention.

FIG. 2 is the molecular weight distribution curve obtained from gel chromatography of the copolymer of ethylene with α-olefin in accordance with Example 11 of the present invention.

BEST MODE

Hereinafter, the embodiments of the present invention will be described in detail with reference to accompanying Examples, which are not intended to restrict the scope of the invention.

Unless being stated otherwise, all experiments for synthesizing the ligands and catalysts were carried out under nitrogen atmosphere with standard Schlenk or glove-box technique, and the organic solvents were used after they had been dried via reflux over sodium metal and benzophenone, and then distilled immediately before use. $^1$H-NMR analyses of the ligands and catalysts synthesized were performed by using Varian Oxford 300 MHz at ambient temperature.

As the solvent for polymerization, cyclohexane was used after passing through a tube filled with Q-5 catalyst (from BASF), silica gel and activated alumina, and being bubbled by nitrogen with high purity to sufficiently remove moisture, oxygen and other catalyst poison.

The polymers thus obtained were analyzed by the methods described below.

1. Melt Flow Index (MI)

MI was measured according to ASTM D 2839.

2. Density

Density was measured by using density gradient tube, according to ASTM D 1505.

3. Analysis of Melting Temperature (Tm)

Tm was measured under $2^{nd}$ heating condition at a rate of 10° C./min in the presence of nitrogen atmosphere, by means of Dupont DSC 2910.

4. Molecular weight and molecular weight distribution

Molecular weight was measured at 135° C. at a rate of 1.0 mL/min in the presence of 1,2,3-trichlorobenzene solvent by using PL210 GPC provided with PL Mixed-BX2+preCol. Molecular weight was calibrated by using PL polystyrene standards.

5. α-Olefin content (wt %) in copolymer

α-Olefin content was measured by means of Bruker DRX500 NMR spectroscope at 125 MHz by using 1,2,4-trichlorobenzene/$C_6D_6$ (7/3 by weight) mixed solvent at 120° C. in the $^{13}$C-NMR mode (reference: Randal, J. C. *JMS-Rev. Macromol. Chem. Phys.* 1980, C29, 201).

PREPARATION EXAMPLE 1

Synthesis of bis(2-phenylphenoxy)(pentamethylcyclopentadienyl)titanium(IV) chloride In a dry flask, 2-phenylphenol (1.72 g, 10.1 mmol, Aldrich 99%) was dissolved in toluene (40 mL). With carefully stirring, the solution was cooled to 0° C. After slowly adding n-butyllithium (4.8 mL, 2.5 M in hexane, Aldrich) dropwise to the solution, the temperature was maintained for 1 hour. Solution of pentamethylcyclopentadienyltitanium trichloride (1.64 g, 5.5 mmol) in toluene (10 mL) was then slowly added dropwise thereto. After maintaining the temperature for 1 hour, the mixture was warmed to ambient temperature, and stirred for additional 1 hour. The reactor temperature was raised to 90° C., and reaction was carried out for 12 hours. The reaction mixture was then filtered and evaporated to remove volatiles. Recrystallization from toluene/hexane mixture at −35° C. gave orange solid (2.3 g).

Yield 75%

$^1$H NMR (C$_6$D$_6$) δ=1.54 (s, 15H), 6.74~7.16 (m, 9H) ppm

PREPARATION EXAMPLE 2

Synthesis of (dichloro)(pentamethylcyclopentadienyl)(2-(9',9"-dimethylfluoren-2'-yl)phenoxy)titanium(IV)

Synthesis of 2-bromo-9,9'-dimethylfluorene

A 1000 mL three-necked round bottomed flask was charged with 2-bromofluorene (25 g, 102.0 mmol), iodomethane (43.4 g, 306.0 mmol) and DMSO (300 mL), and the mixture was stirred under nitrogen atmosphere in order to obtain complete dissolution. Solution of potassium tert-butoxide (32.1 g, 285.6 mmol) dissolved in DMSO (400 mL) was slowly added dropwise thereto. The mixture was stirred at ambient temperature for 12 hours, and at 80° C. for 1 hour, and then cooled again to ambient temperature. The reaction mixture was mixed with water (1000 mL), and the resultant mixture was extracted with n-hexane. The organic layer was washed three times with distilled water, dried over magnesium sulfate (MgSO$_4$), and evaporated by using a rotary evaporator to remove solvent. Purification via silica gel column chromatography (eluent: n-hexane), and recrystallization again from n-hexane gave 2-bromo-9,9'-dimethylfluorene (27.0 g, yield: 96.9%) as white solid.

$^1$H-NMR (CDCl$_3$) δ=1.65 (s, 6H), 7.35-7.39 (m, 2H), 7.44-7.50 (m, 2H), 7.58-7.62 (m, 2H), 7.72-7.73 (m, 1H) ppm Synthesis of 2-(2"-methoxyphenyl)-9,9'-dimethylfluorene To a flask charged with 2-bromo-9,9'-dimethylfluorene (27.0 g, 98.8 mmol), 2-methoxyphenylboronic acid (18.0 g, 118.6 mmol), palladium acetate (0.13 g, 0.6 mmol), triphenylphosphine (0.94 g, 3.6 mmol) and potassium phosphate (40.9 g, 177.9 mmol), added was mixture of water (70 mL) and dimethoxyethane (150 mL), and the resultant mixture was heated under reflux for 6 hours. After cooling the mixture to ambient temperature, aqueous ammonium chloride solution (150 mL) and diethyl ether (200 mL) were injected thereto. The organic layer was isolated, and the residue was extracted with diethyl ether. The combined organic layer was dried over magnesium sulfate and evaporated to remove the volatile substances. Purification via silica gel column chromatography (eluent: hexane) gave 2-(2"-methoxyphenyl-9,9'-dimethylfluorene (28.0 g, yield: 94.0%) as solid.

$^1$H-NMR (CDCl$_3$) δ=1.56 (s, 6H), 3.88 (s, 3H), 7.04-7.06 (d, 1H), 7.08-7.11 (t, 1H), 7.33-7.39 (m, 3H), 7.43-7.45 (d, 1H), 7.47-7.48 (d, 1H), 7.56-7.58 (d, 1H), 7.63 (s, 1H), 7.76-7.840 (t, 2H) ppm Synthesis of 2-(9',9"-dimethylfluoren-2'-yl)phenol To solution of 2-(2"-methoxyphenyl)-9,9'-dimethylfluorene (25.0 g, 83.2 mmol) in methylene chloride (400 mL), added dropwise was solution of boron tribromide (100 mL) (1M in methylene chloride) at −78° C., and the mixture reacted for three hours while slowly raising the temperature to ambient temperature. Then, mixture of ice (150 g) and diethyl ether (300 mL) was added thereto. The organic layer was isolated, and the aqueous layer was extracted with diethyl ether. The combined organic layer was dried over magnesium sulfate and evaporated to remove the volatile substances. Purification via silica gel column chromatography (eluent: mixture of hexane and methylene chloride) gave 2-(9',9"-dimethylfluoren-2'-yl)phenol (18.0 g, yield: 75.5%) as white solid.

$^1$H-NMR (CDCl$_3$) δ=1.55 (s, 6H), 7.04-7.07 (m, 2H), 7.30-7.40 (m, 4H), 7.47-7.50 (m, 2H), 7.55 (s, 1H), 7.78-7.80 (d, 1H), 7.85-7.87 (d, 1H) ppm Synthesis of (dichloro)(pentamethylcyclopentadienyl)(2-(9',9"-dimethylfluoren-2'-yl)phenoxy)titanium(IV)

To solution of 2-(9',9"-dimethylfluoren-2'-yl)phenol (5.0 g, 17.1 mmol) in toluene (200 mL), slowly injected was n-butyllithium (2.5 M in hexane, 6.9 mL) at −78° C., and the mixture was stirred at ambient temperature for 12 hours. After chilling the reaction mixture to −78° C., slowly added was solution of (pentamethylcyclopentadienyl)titanium(IV) trichloride (4.7 g, 16.3 mmol) in toluene (100 and the reaction was carried out at ambient temperature for 12 hours. When the reaction was completed, the reaction mixture was filtered through a celite filter, and solvent was removed therefrom. Recrystallization was carried out from purified toluene and hexane at −35° C. The solid was filtered and dried under reduced pressure to obtain (dichloro)(pentamethylcyclopentadienyl)(2-(9',9"-dimethylfluoren-2'-yl)phenoxy)titanium (IV) (5.6 g, yield: 63.9%) as red solid.

$^1$H-NMR (C$_6$D$_6$) δ=1.61 (s, 6H), 1.77 (s, 15H), 7.03-7.05 (t, 1H), 7.16-7.19 (t, 1H), 7.32-7.34 (m, 2H), 7.37-7.39 (d, 1H), 7.42-7.44 (d, 1H), 7.46-7.47 (d, 1H), 7.71-7.77 (m, 3H), 7.82-7.84 (d, 1H) ppm Mass (APCI mode, m/z): 539.4

EXAMPLE 1

In a batch-type polymerization reactor, copolymerization of ethylene with 1-octene was carried out as described below.

In a 2000 mL stainless steel reactor, which had been sufficiently dried and purged with nitrogen, charged was cyclohexane (1140 mL) and 1-octene (150 mL). Then, 54.2 mM solution (11.1 mL) of modified methylaluminoxane-7 (modified MAO-7, 7 wt % Al Isopar solution, from Akzo Nobel) in toluene was added thereto. Then, the temperature of the reactor was raised to 140° C., and bis(2-phenylphenoxy) (pentamethylcyclopentadienyl) titanium(IV) chloride (5 mM solution in toluene) (0.4 mL) which had been synthesized from Preparation Example 1 and 10 mM solution of triphenylmethylinium tetrakispentafluorophenylborate (99%, Boulder Scientific) in toluene (0.6 mL) were sequentially added thereto. By means of ethylene, the pressure in the reactor was then made up to 30 kg/cm$^2$, with continual supply thereof to carry out polymerization. In one minute of the reaction, maximum temperature 165.0° C. was achieved. After 1 minute, 100 mL of ethanol containing 10 vol % of aqueous hydrochloric acid was added to quench the polymerization. Then, the mixture was stirred with 1.5 L of ethanol for 1 hour, and the reaction product was filtered and isolated. The reaction product thus collected was dried in an vacuum oven at 60° C. for 8 hours to obtain 40 g of polymer. The polymer had melt index of 11.3 and density of 0.8821 g/cc. As the result of analysis via gel chromatography, the polymer had weight average molecular weight (Mw) of 42,000 g/mol, molecular weight distribution (Mw/Mn) of 2.10, and 1-octene content of 26.5% by weight.

EXAMPLE 2

Copolymerization of ethylene with 1-octene was carried out according to the same procedure described in Example 1, but using 230 mL of 1-octene.

Maximum temperature reached was 167.5° C., and 44.0 g of the polymer was finally obtained. The polymer had melt index of 15.3 and density of 0.8678 g/cc. As the result of analysis via gel chromatography, the polymer had weight average molecular weight (Mw) of 31,000 g/mol, molecular weight distribution (Mw/Mn) of 2.05, and 1-octene content of 34.4% by weight.

EXAMPLE 3

Copolymerization of ethylene with 1-decease was carried out according to the same procedure described in Example 1, but using 150 mL of 1-decene instead of 1-octene.

Maximum temperature reached was 175° C., and 53.0 g of the polymer was finally obtained. The polymer had melt index of 12.0 and density of 0.8887 g/cc. As the result of analysis via gel chromatography, the polymer had weight average molecular weight (Mw) of 37,000 g/mol, and molecular weight distribution (Mw/Mn) of 2.41.

EXAMPLE 4

Copolymerization of ethylene with 1-decene was carried out according to the same procedure described in Example 1, but using 230 mL of 1-decene instead of 1-octene.

Maximum temperature reached was 169° C., and 50.0 g of the polymer was finally obtained. The polymer had melt index of 16.1 and density of 0.8786 g/cc. As the result of analysis via gel chromatography, the polymer had weight average molecular weight (Mw) of 34,000 g/mol, and molecular weight distribution (Mw/Mn) of 2.25.

EXAMPLE 5

Copolymerization of ethylene with 1-decene was carried out according to the same procedure described in Example 1, but raising the reaction temperature to 80° C. before feeding the catalyst and using 150 mL, of 1-decene.

Maximum temperature reached was 156.0° C., and 100.0 g of the polymer was finally obtained. The polymer had melt index of 8.0 and density of 0.8815 g/cc. As the result of analysis via gel chromatography, the polymer had weight average molecular weight (Mw) of 65,000 g/mol and molecular weight distribution (Mw/Mn) of 2.30.

EXAMPLE 6

Copolymerization of ethylene with 1-octene was carried out according to the same procedure described in Example 1, but using (dichloro)(pentamethylcyclopentadienyl)(2-(9',9"-dimethylfluoren-2'-yl)phenoxy)titanium(IV) prepared from Preparation Example 2 as catalyst.

Maximum temperature reached was 175° C., and 48 g of the polymer was finally obtained. The polymer had melt index of 5.5 and density of 0.8840 g/cc. As the result of analysis via gel chromatography, the polymer had weight average molecular weight (Mw) of 82,000 g/mol, molecular weight distribution (Mw/Mn) of 2.25, and 1-octene content of 25.5% by weight.

EXAMPLE 7

Copolymerization of ethylene with 1-octene was carried out according to the same procedure described in Example 6, but using 60 mL of 1-octene.

Maximum temperature reached was 176.0° C., and 46 g of the polymer was finally obtained. The polymer had melting point of 91.5° C., melt index of 4.0 and density of 0.8979 g/cc. As the result of analysis via gel chromatography, the polymer had weight average molecular weight (Mw) of 86,000 g/mol, molecular weight distribution (Mw/Mn) of 2.17, and 1-octene content of 17.9% by weight.

EXAMPLE 8

Copolymerization of ethylene with 1-octene was carried out according to the same procedure described in Example 6, but using 230 mL of 1-octene.

Maximum temperature reached was 170° C., and 42 g of the polymer was finally obtained. The polymer had melt index of 13.0 and density of 0.8680 g/cc. As the result of analysis via gel chromatography, the polymer had weight average molecular weight (Mw) of 37,000 g/mol, molecular weight distribution (Mw/Mn) of 2.21, and 1-octene content of 32.0% by weight.

EXAMPLE 9

Copolymerization of ethylene with 1-octene was carried out according to the same procedure described in Example 8, but raising the reaction temperature to 80° C. before feeding the catalyst.

Maximum temperature reached was 149° C., and 95 g of the polymer was finally obtained. The polymer had melt index of 4.1 and density of 0.8710 g/cc. As the result of analysis via gel chromatography, the polymer had weight average molecular weight (Mw) of 83,000 g/mol, molecular weight distribution (Mw/Mn) of 2.09, and 1-octene content of 30.5% by weight.

EXAMPLES 10 to 12

In a continuous polymerization reactor, copolymerization of ethylene with 1-octene was carried out as described below.

All substances for the reaction including catalyst, reaction solvent and monomers were continually injected into a 420 mL reactor by using a quantitative pump, and removal of unreacted monomers and solvent and recovery of the polymer from the polymerized reaction mixture were carried out continually. Cyclohexane was used as polymerization solvent, and the flow rate of individual substances and primary reaction conditions are shown in Table 1.

To the reaction mixture exited from the reactor, added was palagonic acid at a flow rate of 5.2 mmol/hr to inactivate the catalyst. The unreacted monomers and solvent were removed therefrom to obtain polymer. For Examples 10 and 11, used was bis(2-phenylphenoxy)(pentamethylcyclopentadienyl)titanium(IV) chloride prepared from Preparation Example 1 as catalyst, while for Example 12, (dichloro)(pentamethylcyclopentadienyl)(2-(9',9"-dimethylfluoren-2'-yl)phenoxy)titanium (IV) prepared from Preparation Example 2. The amount of catalyst is shown in Table 1.

Ti represents single activation point catalyst, Al represents triisobutylaluminum as cocatalyst, and B represents triphenylmethylinium tetrakispentafluorophenylborate. The catalyst was injected after being dissolved in toluene in a concentration of 0.2 g/L. The synthesis was carried out by using 1-octene as the comonomer. Conversion in the reactor was determined by gas chromatography analysis of the process stream at the end of the reactor, under the individual reaction conditions. Table 2 shows the analytical results of copolymers of ethylene with 1-octene, prepared from Examples 10 and 11.

TABLE 1

|  | Ex. 10 | Ex. 11 | Ex. 12 |
| --- | --- | --- | --- |
| Flow rate of overall solution (kg/h) | 4.5 | 4.5 | 5 |
| Flow rate of ethylene (kg/h) | 0.41 | 0.36 | 0.50 |
| Proportion of 1-octene (1-octene/ethylene) | 0.5 | 0.9 | 0.3 |
| Amount of Ti (μmol/h) | 6.7 | 5.4 | 20.0 |
| Al/Ti molar ratio | 30 | 35 | 44 |
| B/Ti molar ratio | 3 | 3 | 3 |

TABLE 1-continued

|  | Ex. 10 | Ex. 11 | Ex. 12 |
| --- | --- | --- | --- |
| Reaction temperature (° C.) | 93.0 | 90.0 | 152.0 |
| Conversion (%) | 82.0 | 70.0 | 92.4 |
| MI (g/10 min) | 1.3 | 6.1 | 10.12 |
| Density (g/cc) | 0.8876 | 0.8701 | 0.8872 |

Ti: Ti in the catalyst
Al: Triisobutylaluminum as cocatalyst
B: Triphenylmethylinium tetrakispentafluorophenylborate as cocatalyst

TABLE 2

|  | Example 10 | Example 11 |
| --- | --- | --- |
| MI | 1.3 | 6.1 |
| Density | 0.8872 | 0.8701 |
| Content of 1-octene (wt %) | 23.5 | 32.7 |
| Tm (° C.) | 78.7 | 60.1 |
| Mw | 94,700 | 71,500 |
| Mw/Mn | 2.07 | 2.1 |
| Flexural strength (kg/cm²) | 435 | 185 |
| Hardness (shore A) | 78.3 | 62.6 |
| Displacement to Peak (mm) | 46.2 | 37.5 |

As can be seen from the Examples, copolymers of ethylene with α-olefin, having the density of not more than 0.910 g/cc and high molecular weight of not less than 30,000 with narrow molecular weight distribution of not more than 3 could be successfully produced under batch or continuous reaction conditions by employing the catalyst composition and the process for preparation according to the invention.

FIG. 1 is $^{13}$C-NMR spectrum of the copolymer of ethylene with α-olefin prepared from Example 11, which shows spectrum of typical random copolymer. The content of α-olefin in the polymer can be determined in accordance with a method disclosed by Randal, J. C. (*JMS-Rev. Macromol. Chem. Phys.* 1980, C29, 201), which is incorporated herein as a reference.

FIG. 2 is the molecular weight distribution curve obtained from gel chromatography of the copolymer ethylene with α-olefin prepared from Example 11. By referring to FIG. 2, one can confirm the molecular weight distribution of the copolymer prepared from Example 11 in view of the range of the molecular weight distribution curve as shown in Table 2.

Though the present invention is described in detail with referring to Examples as above, a person having ordinary skill in the industrial field to which the invention belongs can make various modification without departing from the spirit or scope of the invention, which was defined by appended claims. Thus, any alteration or modification of the Examples of the invention to come would not depart from the technique of the present invention.

INDUSTRIAL APPLICABILITY

The copolymers of ethylene with α-olefin prepared according to the present invention are applicable to impact resistant reinforcing agent for crystalline polymers, film, soft package materials, molded products, wire coatings, hot-melt adhesives, and the like.

Since the catalyst composition suggested by the present invention exists homogeneously in the polymerization reactor, it is preferably applied to solution polymerization process carried out at a temperature higher than the melting point of the corresponding polymer. However, the transition metal catalyst or cocatalyst may be supported on porous metal oxide carrier and employed for slurry polymerization or gas-phase polymerization process as heterogeneous catalyst composition.

The invention claimed is:

1. A process for preparing copolymers of ethylene with α-olefin, having the density of 0.850~0.910 by copolymerizing ethylene with (C3-C18) α-olefin in the presence of catalyst composition comprising transition metal compound catalyst represented by Chemical Formula (1) in a single reactor or continuous reactors connected in series or in parallel for 2-stage reaction:

[Chemical Formula 1]

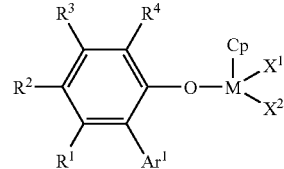

[In Chemical Formula (1),

M represents transition metal from Group 4 in the Periodic Table of Elements;

Cp represents cyclopentadienyl ring which is $\eta^5$-linkable to the core metal M, or a fused ring containing a cyclopentadienyl ring, and the cyclopentadienyl ring or the fused ring containing a cyclopentadienyl ring may be further substituted by one or more substituent(s) selected from (C1-C20)alkyl, (C6-C30)aryl, (C2-C20)alkenyl and (C6-C30)ar(C1-C20)alkyl;

$R^1$ through $R^4$ independently represent hydrogen atom, halogen atom, (C1-C20)alkyl, (C3-C20)cycloalkyl, (C6-C30)aryl, (C6-C30)ar(C1-C10)alkyl, (C1-C20) alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^1$ through $R^4$ may be linked to an adjacent substituent via (C3-C12) alkylene or (C3-C12) alkenylene with or without containing a fused ring to form an alicyclic ring, or a monocyclic or polycyclic aromatic ring;

$Ar^1$ represents (C6-C30)aryl or (C3-C30)heteroaryl containing one or more heteroatom(s) selected from N, O and S;

$X^1$ represents halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20) alkylamino, (C6-C30)arylamino, (C1-C20)alkylthio, (C6-C30)arylthio, or

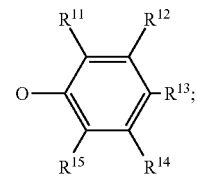

X2 represents

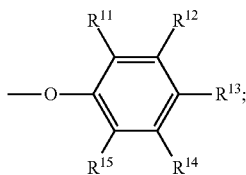

$R^{11}$ through $R^{15}$ independently represent hydrogen atom, halogen atom, (C1-C20)alkyl, (C3-C20)cycloalkyl, (C6-C30)aryl, (C6-C30)ar(C1-C10)alkyl, (C1-C20) alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^{11}$ through $R^{15}$ may be linked to an adjacent substituent via (C3-C12)alkylene or (C3-C12) alkenylene with or without containing a fused ring to form an alicyclic ring, or a monocyclic or polycyclic aromatic ring; and the alkyl, aryl, cycloalkyl, aralkyl, alkoxy, alkylsiloxy, arylsiloxy, alkylamino, arylamino, alkylthio or arylthio of $R^1$ through $R^4$, $R^{11}$ through $R^{15}$, $X^1$ and $X^2$; the ring formed by linkage of each of $R^1$ through $R^4$ or $R^{11}$ through $R^{15}$ to an adjacent substituent via alkylene or alkenylene; or the aryl or heteroaryl of $Ar^1$ and $Ar^{11}$ may be further substituted by one or more substituent(s) selected from halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro and hydroxyl.]

2. The process for preparing copolymers of ethylene with α-olefin according to claim 1, wherein M is Ti, Zr or Hf in the transition metal catalyst of Chemical Formula (1).

3. The process for preparing copolymers of ethylene with α-olefin according to claim 2, wherein the transition metal catalyst is selected from those represented by one of Chemical Formulas (1-6) to (1-14):

[Chemical Formula 1-6]

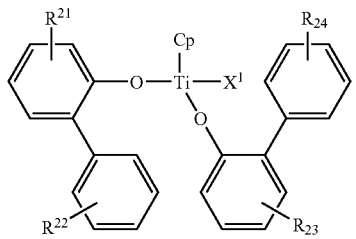

[Chemical Formula 1-7]

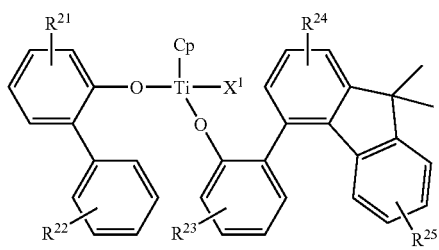

[Chemical Formula 1-8]

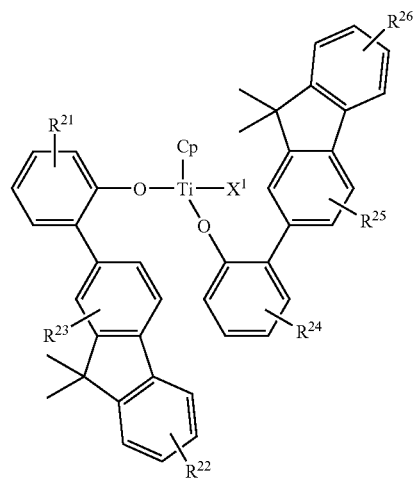

[Chemical Formula 1-9]

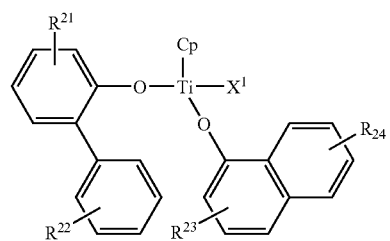

[Chemical Formula 1-10]

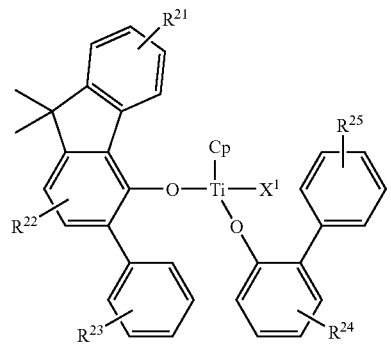

[Chemical Formula 1-11]

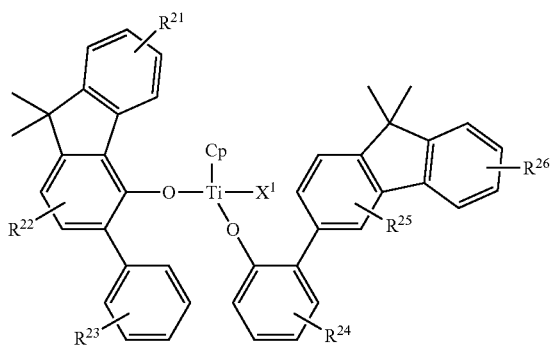

-continued

[Chemical Formula 1-12]

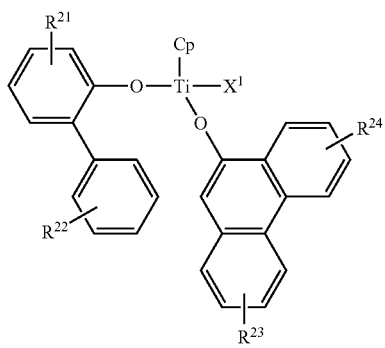

[Chemical Formula 1-13]

[Chemical Formula 1-14]

wherein,
R$^{21}$ through R$^{26}$ independently represent hydrogen atom, halogen atom, (C1-C20)alkyl, (C3-C20)cycloalkyl, (C6-C30)aryl, (C6-C30)ar(C1-C10)alkyl, (C1-C20) alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of R$^{21}$ through R$^{26}$ may be linked to an adjacent substituent via (C3-C12)alkylene or (C3-C12) alkenylene with or without containing a fused ring to form an alicyclic ring, or a monocyclic or polycyclic aromatic ring; the alkyl, aryl, cycloalkyl, aralkyl, alkoxy, alkylsiloxy, arylsiloxy, alkylamino, arylamino, alkylthio or arylthio of R$^{21}$ through R$^{26}$ may be further substituted by one or more substituent(s) selected from halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro and hydroxyl;
Cp represents a cyclopentadienyl ring which is η$^5$-linkable to the core metal M, or a fused ring containing a cyclopentadienyl ring, and the cyclopentadienyl ring or the fused ring containing a cyclopentadienyl ring may be further substituted by one or more substituent(s) selected from (C1-C20)alkyl, (C6-C30)aryl, (C2-C20) alkenyl and (C6-C30)ar(C1-C20)alkyl; and
X$^1$ represents methyl or Cl.

4. The process for preparing copolymers of ethylene with α-olefin according to claim 3, wherein the transition metal catalyst is selected from those represented by one of Chemical Formulas 1-6-1 to 1-14-1:

1-6-1

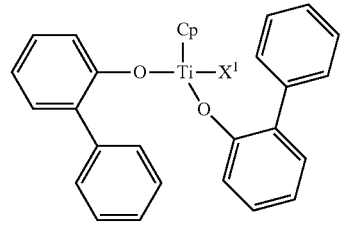

1-6-2

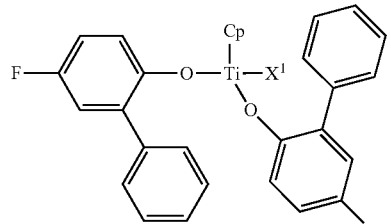

1-6-3

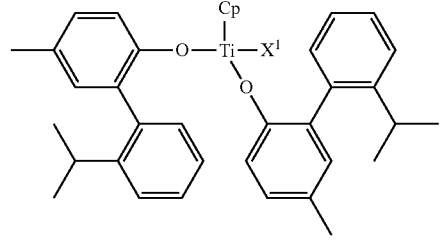

1-6-4

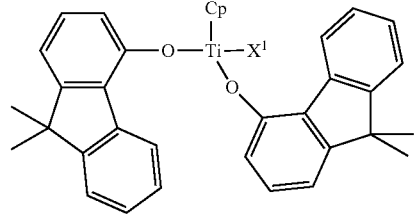

1-7-1

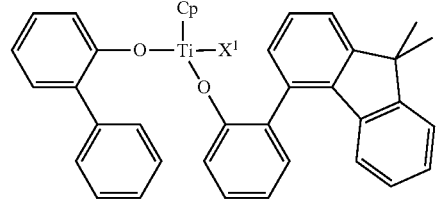

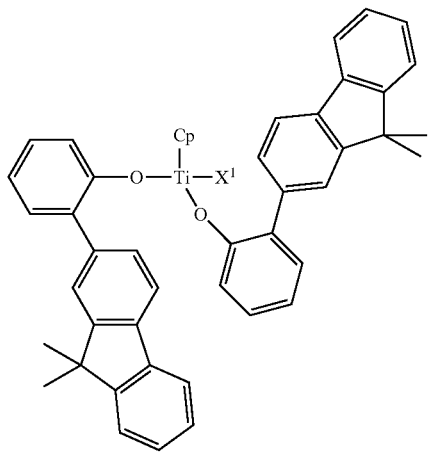

1-8-1

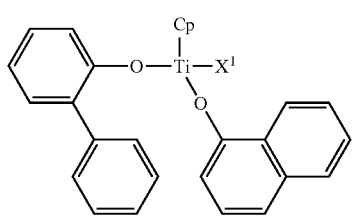

1-9-1

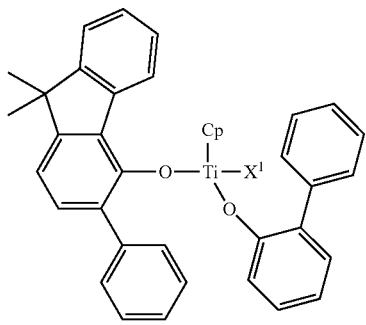

1-10-1

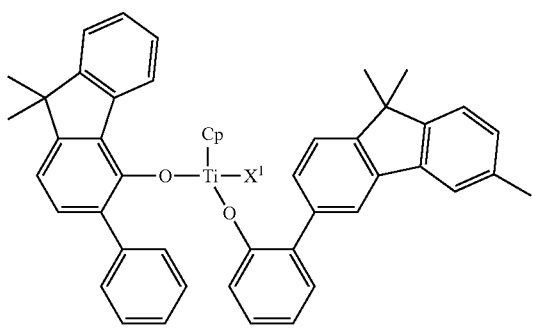

1-11-1

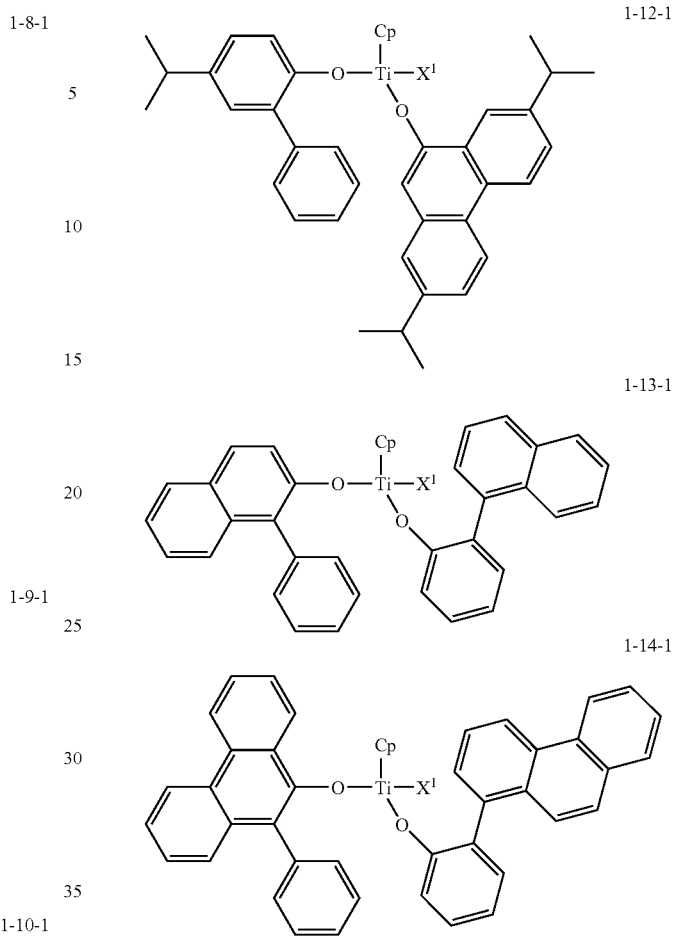

wherein, Cp independently represents cyclopentadienyl ring which is η⁵-linkable to core metal Ti, or a fused ring containing a cyclopentadienyl ring, and the fused ring containing a cyclopentadienyl ring may be further substituted by one or more substituent(s) selected from (C1-C20)alkyl, (C6-C30)aryl, (C2-C20)alkenyl and (C6-C30)ar(C1-C20)alkyl; and $X^1$ represents methyl or Cl.

5. The process for preparing copolymers of ethylene with α-olefin according to claim 1, wherein the catalyst composition comprises the transition metal catalyst of Chemical Formula (1), and cocatalyst selected from aluminoxane compounds, alkylaluminum compounds, boron compounds and mixtures thereof.

6. The process for preparing copolymers of ethylene with α-olefin according to claim 5, wherein the ratio of the transition metal catalyst to the cocatalyst is 1:0.5~50:1~1,000 on the basis of molar ratio of transition metal M: boron atom: aluminum atom.

7. The process for preparing copolymers of ethylene with α-olefin according to claim 5, wherein the boron compound cocatalyst is selected from N,N-dimethylanilinium tetrakispentafluorophenylborate and triphenylmethylinium tetrakispentafluorophenylborate, and mixtures thereof.

8. The process for preparing copolymers of ethylene with α-olefin according to claim 1, wherein the α-olefin comonomer is selected from propylene, 1-butene, 1-pentene, 4-methyl-1-pentene, 1-hexene, 1-octene, 1-decene, 1-dodecene, and mixtures thereof.

9. The process for preparing copolymers of ethylene with α-olefin according to claim 1, wherein the content of α-olefin comonomer is from 10% by weight to 60% by weight of the copolymer.

10. The process for preparing copolymers of ethylene with α-olefin according to claim 9, wherein the content of α-olefin comonomer is from 20% by weight to 45% by weight of the copolymer.

11. The process for preparing copolymers of ethylene with α-olefin according to claim 1, wherein the density of the copolymer is from 0.855 to 0.905 g/cc.

12. The process for preparing copolymers of ethylene with α-olefin according to claim 11, wherein the density of the copolymer is from 0.860 to 0.900 g/cc.

13. The process for preparing copolymers of ethylene with α-olefin according to claim 1, wherein the weight average molecular weight is from 30,000 to 500,000, and the molecular weight distribution (Mw/Mn) is from 1.5 to 3.0.

14. The process for preparing copolymers of ethylene with α-olefin according to claim 1, wherein the pressure in the reactor for the process is from 10 to 150 atm, and the temperature for polymerization is from 80 to 250° C.

* * * * *